US010862952B1

(12) United States Patent
Lazier

(10) Patent No.: US 10,862,952 B1
(45) Date of Patent: Dec. 8, 2020

(54) MIGRATION OF OPERATIONAL COMPUTING HARDWARE TO A DATA CENTER

(71) Applicant: Amazon Technologies, Inc., Seattle, WA (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 15/473,973

(22) Filed: Mar. 30, 2017

(51) Int. Cl.
*G06F 15/173* (2006.01)
*H04L 29/08* (2006.01)
*H04L 12/46* (2006.01)

(52) U.S. Cl.
CPC .......... *H04L 67/10* (2013.01); *H04L 12/4641* (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 2010/0139887 A1* | 6/2010 | Slessman | ........... | H05K 7/20763 165/67 |
| 2012/0213069 A1* | 8/2012 | Oguchi | ................. | H04W 80/06 370/231 |
| 2013/0042003 A1* | 2/2013 | Franco | ................ | G06F 9/45558 709/226 |
| 2014/0254085 A1* | 9/2014 | Slessman | ............... | B65D 15/08 361/679.31 |
| 2014/0372595 A1* | 12/2014 | Ashok | ................. | H04L 41/0853 709/224 |
| 2016/0019497 A1* | 1/2016 | Carvajal | ............... | H04W 4/029 701/519 |
| 2016/0080490 A1* | 3/2016 | Verma | ..................... | G06F 3/067 709/217 |
| 2016/0191365 A1* | 6/2016 | Wakeman | ............... | H04L 43/10 709/224 |
| 2016/0323356 A1* | 11/2016 | Ribeiro | ................. | H04W 40/34 |
| 2017/0048314 A1* | 2/2017 | Aerdts | ................ | H04L 67/1097 |
| 2017/0177840 A1* | 6/2017 | Srivastava | ............ | G06F 9/5072 |
| 2017/0371696 A1* | 12/2017 | Prziborowski | ...... | G06F 9/45558 |
| 2018/0013791 A1* | 1/2018 | Healey | ................ | H04L 41/0863 |

* cited by examiner

*Primary Examiner* — Dhairya A Patel
(74) *Attorney, Agent, or Firm* — Kilpatrick Townsend & Stockton LLP

(57) ABSTRACT

Migration techniques are described. In an example, a computing system sends instructions associated with operational computing hardware to a client device. The instructions are sent based on a client request for relocating the operational computing hardware from a client location. This hardware is configured to provide client compute operations and store client data. The computing system provisions a private network within a data center of a provider. Based on an arrival of the portable enclosure with the operational computing hardware from the client location to a provider location associated with the data center, the computing system establishes a network connection between the private network and the operational computing hardware stored in the portable enclosure. The computing system provides remote access to the operational computing hardware via the private network based at least in part on the network connection.

20 Claims, 7 Drawing Sheets

MIGRATION OF OPERATIONAL COMPUTING HARDWARE TO A DATA CENTER

BACKGROUND

Entities rely on computing resources for day-to-day operations. The complexity of computing resources may depend on the size of an entity and its compute operations. Generally, the larger the entity is or the more sophisticated the compute operations are, the more complex the computing resources become. For entities that use petabytes (PBs) or exabytes (EBs) of data, such as large enterprises, data centers may be used. Many of these entities manage their own data centers.

Over time, moving away from its own data center to the cloud may become an attractive solution for an entity. The cloud may represent a set of virtual computing resources hosted within a data center of a provider. The virtualization may enable a dynamic, scalable, reliable, and easy to use solution.

Moving the computing resources to the cloud may be referred to as migration of the computing resources. Different types of migration exist. Data migration may represent transferring the data of the entity to a storage location within the hosting data center. Compute migration may represent virtualizing the compute operations of the entity. However, the migration, whether data or compute, may be technically difficult and time consuming. For example, consider the case of data migration. Even with high-end connections, moving petabytes or exabytes of data across the Internet can take years or decades. For instance, migration of 100 PB of data could take more than twenty years to accomplish over a direct connect line with a one gigabit per second (1 Gbps) connection.

BRIEF DESCRIPTION OF THE DRAWINGS

Various embodiments in accordance with the present disclosure will be described with reference to the drawings, in which.

DETAILED DESCRIPTION

Figure 1:
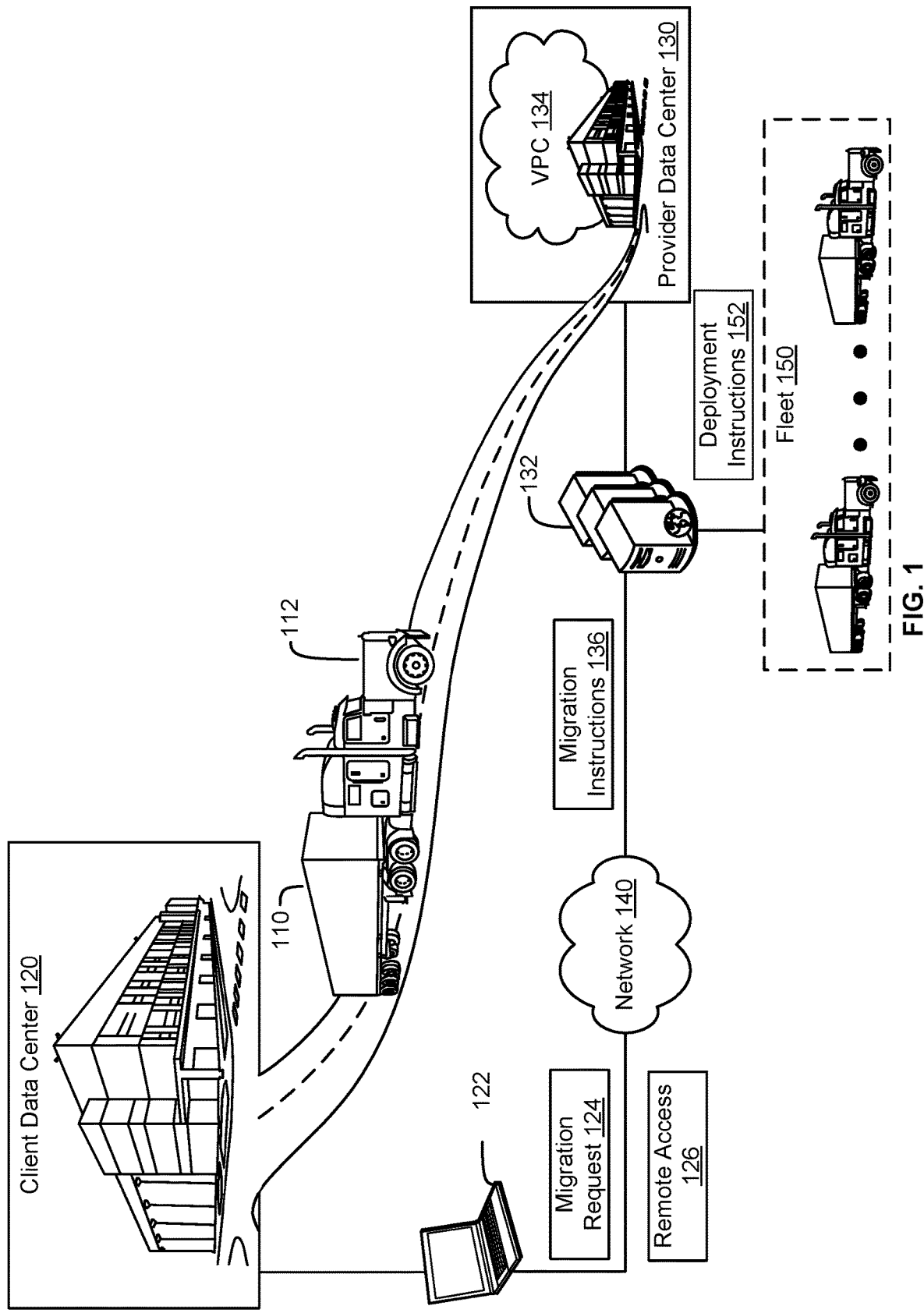
FIG. 1 illustrates an example environment for migrating operational computing hardware of a client to a computing environment of a provider based on a portable container, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order to not obscure the embodiment being described.

Embodiments of the present disclosure are directed to, among other things, migration of computing resources, including any or a combination of data migration and compute migration. In an example embodiment, techniques for migrating operational computing hardware of a client to a data center of a provider are described. In this example, the operational computing hardware may include computing resources already deployed at a client location. Such resources may provide compute operations and store data for the client. A request may be received by a computing system of the provider from a client device and may relate to relocating the operational computing hardware from the client location to the data center of the provider. Based on this request, the computing system may update or provision a private network within the data center for the client. The private network may support compute operations and data storage. For instance, the private network may include compute instances and storage volumes. A portable enclosure may also be available for the relocation. The portable enclosure may be configured to at least store the operational computing hardware. The storage may be temporary or permanent. For instance, the portable enclosure may be a ruggedized shipping container that provides space, racks, power, data connectivity interfaces, cooling, and physical security for storing and transporting the operational computing hardware. The combination of the portable enclosure and the stored operational computing hardware may represent a mobile colocation center (e.g., a "mobile colo"). The computing system may generate instructions about deployment of the portable enclosure to the client location. Once the deployment is complete and upon arrival of the portable enclosure with the stored operational computing hardware at the data center of the provider, the computing system may establish a network connection between the private network and the stored operational computing hardware. Remote access of the client device to this hardware may be provided via the private network over the network connection. The remote access may allow the client to use the operational computing hardware for compute and data storage operations while this hardware is connected to the provider's data center. Further, the computing system may initialize the data and compute migrations of the operational computing hardware to the private network. Once the migrations are complete, the operational computing resource may be decommissioned, returned to the client, and/or repurposed for usage of other clients.

To illustrate, consider an example of a large enterprise that operates a client data center as a disaster recovery site. The client data center may store hundreds of petabytes of client data and provide back-up compute operations. The migration of the client data center to a provider data center may occur during a scheduled downtime of the recovery site. Accordingly, a portable enclosure may be deployed on a transportation vehicle to the recovery site. Instructions about this deployment may be generated and sent to a client device. Once the client data center has been physically moved to the portable enclosure based on the instructions, the transportation vehicle may travel to the provider data center. Upon arrival, the portable enclosure may be removed from the transportation vehicle and stored in a secure area. Power and data connectivity may be provided to the stored client data center via power and data interfaces of the portable enclosure. The data interface may include a rack of connectors providing high-speed connectivity (e.g., one terabit per second (1 Tbps) or higher) to connect the operational computing hardware to a backbone of the provider data center over a direct link. A virtual private cloud (VPC) may be provisioned within the provider data center for the large enterprise. A virtual private network (VPN) connection may be established between the VPC and the stored client data center over the direct link. Data and compute migrations may be performed. For example, the client data may be transferred from the client data center to the VPC. Because of the high-speed connectivity, this transfer may be completed in less than ten days (compared to over twenty years with existing migration systems). Independently of the data migration, the compute devices of the client data center may remain operational and accessible for use via the VPC. However, if a computing device responsible for particular compute operations nears its end of life or necessitates an upgrade, one or more compute instances may be launched in the VPC. These instances may provide the particular compute operations. The computing device may then be decommissioned.

The embodiments of the present disclosure provide a number of technical benefits relative to existing migration systems. In an example, the migration may be relatively quicker. For instance, migration of 100 PB of data may occur in less than ten days (compared to twenty years).

In addition, speed of light and throughput issues may be mitigated or resolved. For instance, during data migration, a portion of the data may reside on a client storage device and the remaining portion may have been transferred to a provider storage device. Straddling the two data portions may result in poor performance unless the storage devices provide similar response characteristics in terms of latency and throughput. The embodiments of the present disclosure may improve this performance because the two devices would exhibit similar response characteristics given the geographic proximity and the high-speed direct data link between the two. Further, the straddling may be shortly lived because of the quicker data migration. Once the data migration is complete, the straddling may no longer be needed and the performance issues may be completely resolved.

In another example, the compute migration may be optimized based on the life of the existing client hardware. Rather than an early decommission of the client hardware, the compute migration need not occur until the end of life of the client hardware. Until occurrence of the delayed decommission, the client hardware may be available and usable to the client.

In yet another example, the migration may be flexible and scalable. For instance, the client may dynamically, selectively, and on-demand migrate particular data portions or compute operations while retaining other portions and operations on its hardware. In another illustration, the client hardware may include a particular computing resource that provides a specialized compute operation. Even if the provider data center does not support the specialized compute operation, the other compute operations may be migrated. The particular computing resource may remain available and usable to the client. Once supported, the specialized compute operation may be migrated to the provider data center.

These and other benefits are further described herein and will become apparent from the present disclosure. In in the interest of clarity of explanation, the embodiments are described in connection with migrating a client data center to a provider data center. This migration may generally include data and/or compute migration from the client data center. However, the embodiments are not limited as such. Instead, the embodiments similarly cover migrating other types of operational computing hardware to a computing environment of a provider. Generally, operational computing hardware of a client may represent a set of computing resources configured to provide client compute operations and to store client data. The client compute operation may include any compute operations of the client such as reading from and writing data to the set computing resources or to another set of computing resources. The client data may represent data generated by and/or for the client and available for storage. The computing environment of the provider may represent a set of computing resources configured to host compute operations and store data for a number of clients of the provider.

FIG. 1 illustrates an example environment for migrating operational computing hardware of a client to a computing environment of a provider based on a portable container 110. In the illustrated example, a data center of a client (referred to herein as a client data center 120) is migrated to a data center of a provider (referred to herein as a provider data center 130). A transportation vehicle 112 may be available to transport the portable container 110 between the client data center 120 and the provider data center 130.

In an example embodiment, the client may operate a client device 122 to send a migration request 124 to a computing system 132 of the provider over a public network 140. If one is not already provisioned for the client, the computing system 132 may provision a virtual private cloud (VPC) 134 within the provider data center 130. The computing system 132 may also send migration instructions 136 to the client device 122 over the public network 140. The computing system 132 may also identify, from a fleet 150 of portable enclosures and/or transportation vehicles, the portable enclosure 110 and/or the transportation vehicle 112 as being suitable for the migration. The computing system 132 may generate deployment instructions 152 to deploy the portable enclosure 110 to the client data center 120.

The portable enclosure 110 may be deployed to a location of the client data center 120. Once at the client location, the transportation vehicle 112 may be parked or the portable enclosure 110 may be left thereat. Thereafter, the client data center 120 may be physically relocated to the portable enclosure 110 based on the migration instructions 136. For example, the relevant hardware of the client data center 120 may be moved to and stored on equipment racks of the portable enclosure 110. This hardware may include any operational computing hardware that provides client compute operations and stores client data, such as servers, storage, networking equipment, and other hardware running software for the client. Power and data connections between the various hardware components may be re-established. Power and data connectivity may be provided via power and data interfaces of the portable enclosure 110. Cooling may also be provided to the hardware. In this way, once installed in the portable enclosure 110, the client hardware may be interconnected, powered up, data connected, and cooled in a way that replicates the client data center 120. In other words, the combination of the portable enclosure 110 and the installed client hardware may represent a mobile colocation center that replicates the client data center 120. Prior to leaving the client location, this mobile colocation center may be tested to ensure that the replication is correct and operational. Similar testing may be performed once the portable enclosure is at a location associated with the provider data center 130.

Thereafter, the transportation vehicle 112 (or, similarly, another transportation vehicle), may transport the portable enclosure 110 with the installed client hardware to a location of the provider data center 130. En route, some or all of the client hardware may be powered up. For instance, a generator located in the portable enclosure 110 or the transportation vehicle 112 may provide sufficient power via the power interface. Data connectivity may also be provided to the powered client hardware via a wireless data interface. In this way, the client device 122 may maintain data access to the client hardware while en route to the provider data center 130.

In addition, the portable enclosure may include a computing device that interfaces with the wireless data interface and the installed client hardware. The computing device may be configured and used to perform various diagnostics and troubleshooting operations and to provide status information. For example, the computing device may run a test plan to test connectivity of the client hardware, whether there any electrical short or open circuits, and to present the relevant information to a trained operator.

Upon arrival to the provider data center 130, the transportation vehicle 112 may be parked or the portable enclosure 110 may be left in a secure area. Physical access to the secure area may be controlled. The secure area may also be separated from secure areas set up for other clients at the location of the provider data center 130.

Power may be provided from an external source to the client hardware via the power interface of the portable enclosure 110. The client hardware may be cooled by using a cooling source internal or external to the portable enclosure 110. Data connectivity may also be established via the data interface of the portable enclosure 110. For instance, a network connection may be established between the client hardware and a backbone of the provider data center 130 via the data interface and over a direct link. These and other features of connecting and powering the client hardware in the portable enclosure 110 are further illustrated in FIG. 2.

The network connectivity may communicatively and securely couple the client hardware to the VPC 134. For example, the network connectivity may be a VPN connection over the direct link. The client device 122 may have remote access 126 to the client hardware installed in the portable enclosure 110 via the VPC 134 over a public network, such as the public network 140. In this way, the replication of the client data center 120 may be extended to the secure area of the provider. In other words, the client data center 120 (or at least the relevant client hardware) may have been actually relocated to the secure area because the client hardware may still be accessible and usable to the client. The computing system 132 may initialize the migration and compute migration of the client data center 120 to the VPC 134. For example, client data may be transferred to storage of the VPC 134. Client compute instances may also be launched in the VPC 134. Progress, such as migration status, may be reported to the client device 122. These and other features for using the VPC 134 are further illustrated in FIG. 3.

In an example, once a portion or all of the migration is complete, the relevant component of the client hardware may be disconnected from the provider data center 130 for further processing. The processing may depend on the migration request 124 and may include decommissioning, recycling, or returning the component to the client. For instance, if a particular computing device of the client hardware is configured to provide a compute operation and if a compute instance was launched to provide this computed operation, the compute migration of the particular computing device may be complete. This device may be returned to the client if the migration request 124 indicates so.

In another example, rather than disconnecting the relevant component from the provider data center 130, the component may be repurposed and may become a part of the provider data center 130 available for use to clients. For instance, once the migration of the client data center 120 is complete, any client data and configuration may be replaced with provider data and configuration on the underlying computing hardware.

Referring back to the migration request 124, this request may identify the client and the client data center 120. If multiple provider data centers are available, the migration request 124 may further identify the provider data center 130 as the desired target. In an example, the computing system 132 may maintain a profile of the client. The profile may contain information about the location, physical size (e.g., dimensions, weight), and the configuration (e.g., power consumption, cooling, amount of data storage, type and number of computing components, network parameters, part numbers, security policies, etc.) of the client data center 120 (or, more specifically, the operational computing hardware from the client data center 120 that should be migrated). Based on the migration request 124, the computing system 132 may identify the portable enclosure 110 and/or the transportation vehicle 112 from the fleet 150. For instance, the computing system 132 may select the portable enclosure that is the closest to the client location and that has enough space, equipment racks, cooling, power, power interface, and data interface. In addition, the migration request 124 may identify the desired processing of the client hardware (e.g., decommissioning, recycling, returning, or repurposing).

In an example, the migration instructions 136 may include various types of information about deployment of the portable container 110. For instance, the information may identify the portable enclosure 110, the transportation vehicle 112, or an operator thereof. The migration instructions 136 may also include security credentials (e.g., tokens for badge readers) for physical access to the space within the portable enclosure 110 and/or the secure area at the provider data center 130. A test plan for testing the client hardware stored in the portable enclosure 110 may also be a part of the migration instructions 136. In addition, the migration instructions 136 may provide the relevant configuration parameters of the VPC 134 to the client device 122 such that the remote access 126 to the VPC 134 can be facilitated.

The deployment instructions 152 may identify the portable enclosure 110, the transportation vehicle 112, the location of the client data center 120, the location of the provider data center 130, and/or any route between these two locations. The deployment instructions may also include security credentials that authorize access of the operator(s) of the portable enclosure 110 and transportation vehicle 112 to the client location and the secure area of the provider data center 130.

Although FIG. 1 illustrates a land-based transportation vehicle 112, other types of transportation vehicles may be available from the fleet 150 including water and air-based ones. Regardless of the type, the transportation vehicle 112 may be configured to temporarily or permanently hold and transport the portable enclosure 110.

The portable enclosure 110 may be a ruggedized shipping container that is tamper-resistant, water-resistant, temperature controlled, and geolocation-tracked (e.g., via a global positioning system (GPS). In one illustrative example, the portable enclosure may be 45-foot long High Cube shipping container that measures eight foot wide, 9.6 foot tall, and has a curb weight of approximately 68,000 pounds. This container may include removable connector rack with a networking cable. The connector racks may provide multiple forty Gbps interfaces that can transfer up to 1 Tbps in aggregate. The container may also include a bank of power connectors that can transfer up to three-hundred and fifty kilowatts (kW) of power. The container may further include, or another transportation vehicle may hold, a power generator set that can serve as an external power source.

Referring to the computing system 132, in one example, this system may provide functionalities of a control plane to the provider data center 130. Generally, the control plane may provide management services for computing resources in a computing environment. The functionalities may include provisioning, de-provisioning, and monitoring of compute instances and storage volumes, workflow creation, security policy actions, and access to management functionality in connection with data and compute migrations. The control plane may provide a web interface or an application programming interface (API) to submit the migration request 124 and receive the migration instruction 136. The web interface and the API may also be available to the client to update certain configuration parameters of the VPC 134 (e.g., to update an access control list, set-up particular network addresses, request additional storage or compute instances).

Figure 2:
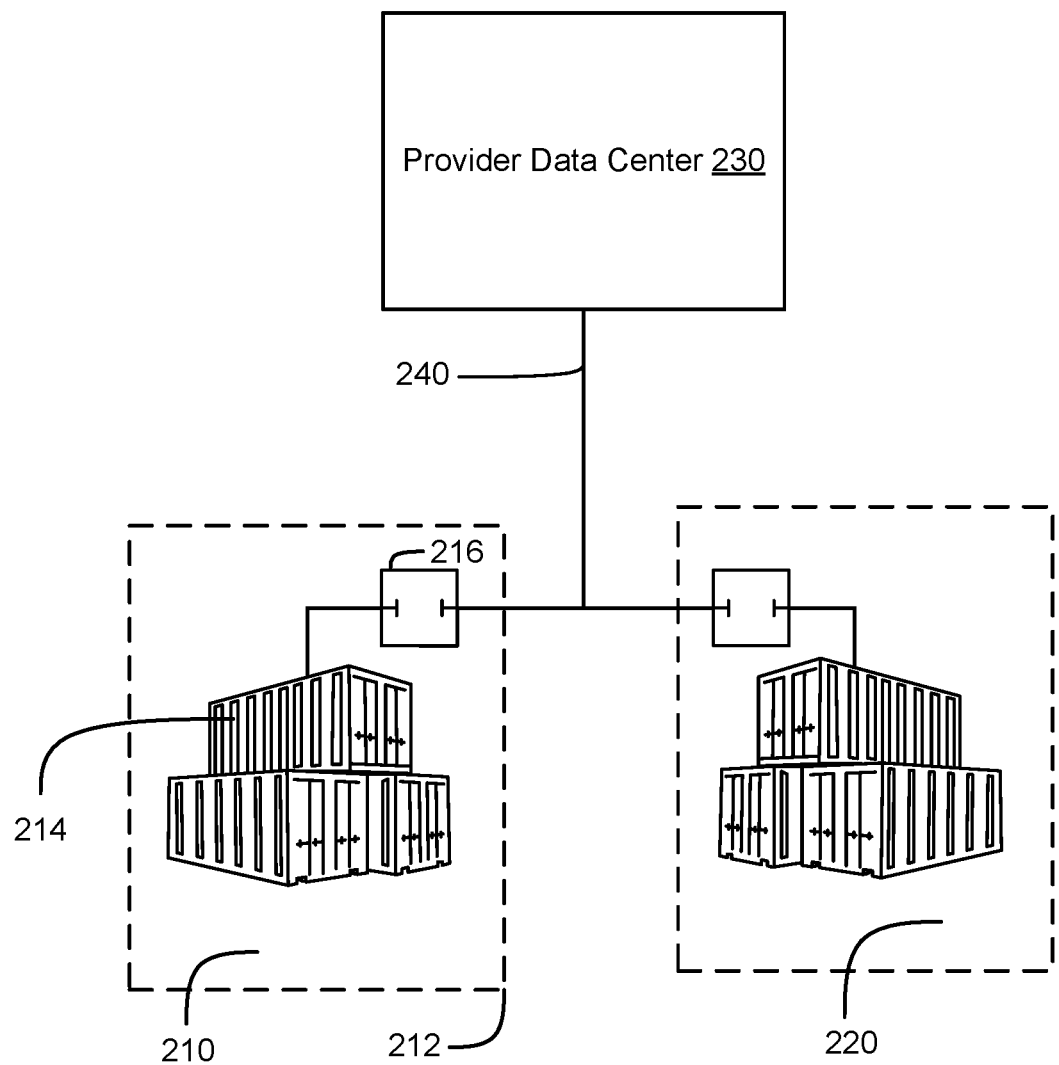
FIG. 2 illustrates an example of secure areas associated with a provider data center, according to embodiments of the present disclosure.

FIG. 2 illustrates an example of secure areas 210 and 220 associated with a provider data center 230. Each secure area may be available for use by a different client. The secure areas 210 and 220 may be separated and secured to provide controlled access thereto. Generally, the secure areas 210 and 220 may be in close geographic proximity to the provider data center 230 such that data connectivity between portable enclosures stored in these areas and the provider data center 230 may have very low latency (e.g., below certain predefined threshold). For instance, each of the areas 210 and 220 may be within a short distance, such as less than two miles, to the provider data center 230.

A data network connection may exist between each of the secure areas 210 and 220 and the provider data center 230. In an example, the data connectivity may be over a direct, high-speed link to a backbones of the provider data center 230. For instance, this link may be a private fiber-optic link providing a 1 Tbps data rate or higher. In another example, the data connectivity may occur over a public network, such as the Internet. In this case, various secure communication protocols, such as IPsec and tunneling protocols, may be used to secure the data connectivity.

In an example embodiment, the secure area 210 may be physically secured using various security mechanisms 212. These mechanisms 212 may include a fence, a gate with a badge reader, cameras, and/or security-related sensors. Physical access to the secure area 210 may necessitate credentials, such as tokens stored in wearable badges.

The secure area 210 may store a number of portable enclosures 214 for the associated client. Various levels of services may be offered to the client in connection with the storage and use of the portable enclosures 214. Some of these services may relate to a power and data network connection 240 with the provider data center 230. For example, the client may select between redundant and non-redundant power connections and/or data network connections. The client may also select whether power and/or data connectivity should be dedicated to one portable enclosure, shared across the portable enclosures 214, or shared with portable enclosures of other clients. Generally this selection may be received in a migration request or may be stored as a preference in a client profile.

Dedicated power may be provided from a power generator or some other power source located within the secure area 210. Shared power may be provided from an external power source. Dedicated data connectivity may involve a dedicated high-speed data link, where one end of the link connects to the provider data center 230, and where the other end of the link connects directly to a data interface of the portable enclosure. Shared data connectivity may involve a high speed-data link that is physically connected to multiple portable enclosures. If this link is shared among multiple clients, a secure communication protocol, such as IPsec or a tunneling protocol, may be used to protect the data traffic of each client.

To support the power and data network connection 240, the secure area 210 may include a power and data interface 216. The power and data interface 216 may be a bank of power relays and connectors and of high-speed data connectors. One end of the power and data interface 216 may be hardwired to a power source(s) and a data link(s). The other end of the power and data interface 216 may provide plug-and-play power and data connections. Power and network cables may connect the plug-and-play side of the power and data interface 216 to a power and data interface of a portable enclosure.

If the secure area 210 stores multiple portable enclosures 214 for the client, the provider data center 230 may host one VPC for all these enclosures 214 or, alternatively, one VPC per portable enclosure. Multiple VPCs of the client may be interconnected or peered such that client data and compute operations may be shared across the VPCs. Regardless of the number of VPCs, data and compute migrations of client hardware from the portable enclosures may be scheduled sequentially, in parallel, or independently of each other. In an example, a portable component may store a subset of the client hardware. The compute and storage components of the subset may have a similar end of life. The subset may have a different end of life than that of another subset stored in another portable enclosure. In this way, the usage, migration, and/or subsequent processing of each subset (e.g., decommissioning, recycling, returning, or repurposing) may be scheduled based on the associated end of life. For instance, the first subset may be removed from the first portable enclosure and recycled upon its end of life, while the usage or migration of the second subset may be ongoing.

The secure area 220 may have similar components. Although FIG. 2 illustrates only two secure areas 210 and 220, a different number of secure areas may exist depending on the number of clients, available space in proximity of the provider data center 230, and/or applicable constraints related to data and compute migrations.

Figure 3:
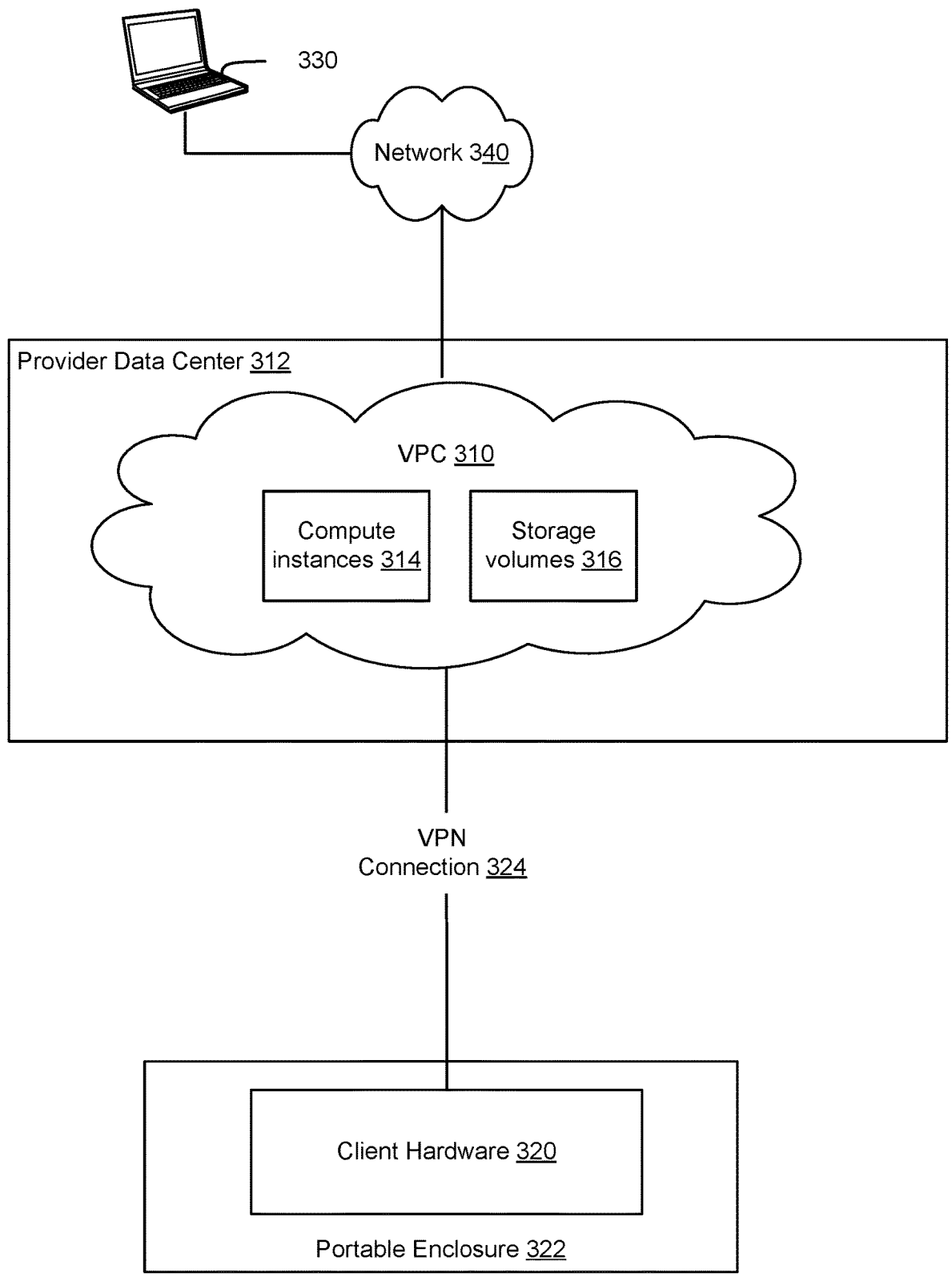
FIG. 3 illustrates an example network topology for connecting various computing resources associated with a client, according to embodiments of the present disclosure.

FIG. 3 illustrates an example network topology for connecting various computing resources associated with a client. The network topology may include data network connections that communicatively couple a VPC 310, client hardware 320, and a client device 330. The VPC 310 may be provisioned within a provider data center 312 for the client. The client hardware 320 may include operational computing hardware of the client such as various compute and storage components originating from a client data center and installed in a portable enclosure 322 for the purpose of migration. The client device 330 may represent a computing resource of the client, where this resource is not part of the migration.

In an example, the VPC 310 may represent a logically isolated private network within the provider data center 312. This private network may include compute instances 314 and storage volumes 316, which may be virtualized. The VPC 310 may be provisioned by setting up various network parameters of the private network, such as a range of internet protocol (IP) addresses that form a subnet, access controls, security policies, type and configurations of the compute instances 314 and storage volumes 316, and other parameters. A hardware-based VPN connection 324 may exist between the VPC 310 and the client hardware 320. A network address translation (NAT) gateway may support address translations. An Internet gateway may be additionally used to connect the VPC 310 to the client device 330 over a public network 340, such as the Internet. VPN and NAT services may be used for this connection. Generally, the use of the VPC 310 may provide various network features that enable customization of the network configuration of the VPC 310, control remote access and inbound/outbound traffic to and from the VPC 310, secure the traffic, and isolate the underlying computing resources.

The VPC 310 may be set-up for the client at different stages. In an example, the VPC 310 may be provisioned and connected to the client's data center prior to and independently of any migration request. In this example, no additional provisioning or updates to the VPC 310 may be needed in response to the migration request. For instance, no IP new address mapping to the subnet or namespace associated with the VPC 310 is needed. Once the relocation is complete, the client hardware 320 may be reconnected to the VPC 310. Nonetheless, if additional client hardware was not previously connected to the VPC 310 and is part of the migration, updates to the VPC 310 may be performed. For instance, the network parameters of the VPC 310 may be updated to connect this new hardware over the hardware-based VPC connection 324. In another example, the client may not have a VPC in place prior to requesting the migration. Accordingly, the VPC 310 may be provisioned for the client in response to its migration request. In yet another example, VPC peering may be used. More specifically, a VPC may already be set-up within the client's data center. The configuration of this VPC may be maintained through the relocation of the client hardware 320. Upon arrival of the portable enclosure 322 to the secure area associated with the provider data center 312, the relocated client VPC may be peered with the VPC 310 hosted within the provider data center 312. Peering may include updating routing tables to point IP address range and updating security groups such that traffic can be routed between private IP addresses within the two VPCs. Compute instances may then communicate with each other as if they are within the same network.

Although FIG. 3 illustrates that the client hardware 320 may be connected to a single VPC 310, one-to-many and many-to-one data network connections may exist. For example, the client hardware 320 may be similarly connected to multiple VPCs that are distributed across a number of provider data centers. In this way, the client hardware 320 may be redundantly migrated to multiple provider data centers. In another example, a portable enclosure may relocate a portion of the client hardware 320 to one provider data center for migration thereto. Another portable enclosure may relocate this same portion (for redundancy reasons) and/or another portion of the client hardware (for geographic distribution reasons) to another provider data center. If multiple VPCs are provisioned for the client and are distributed across multiple provider data centers, these VPCs may be peered.

Figure 4:
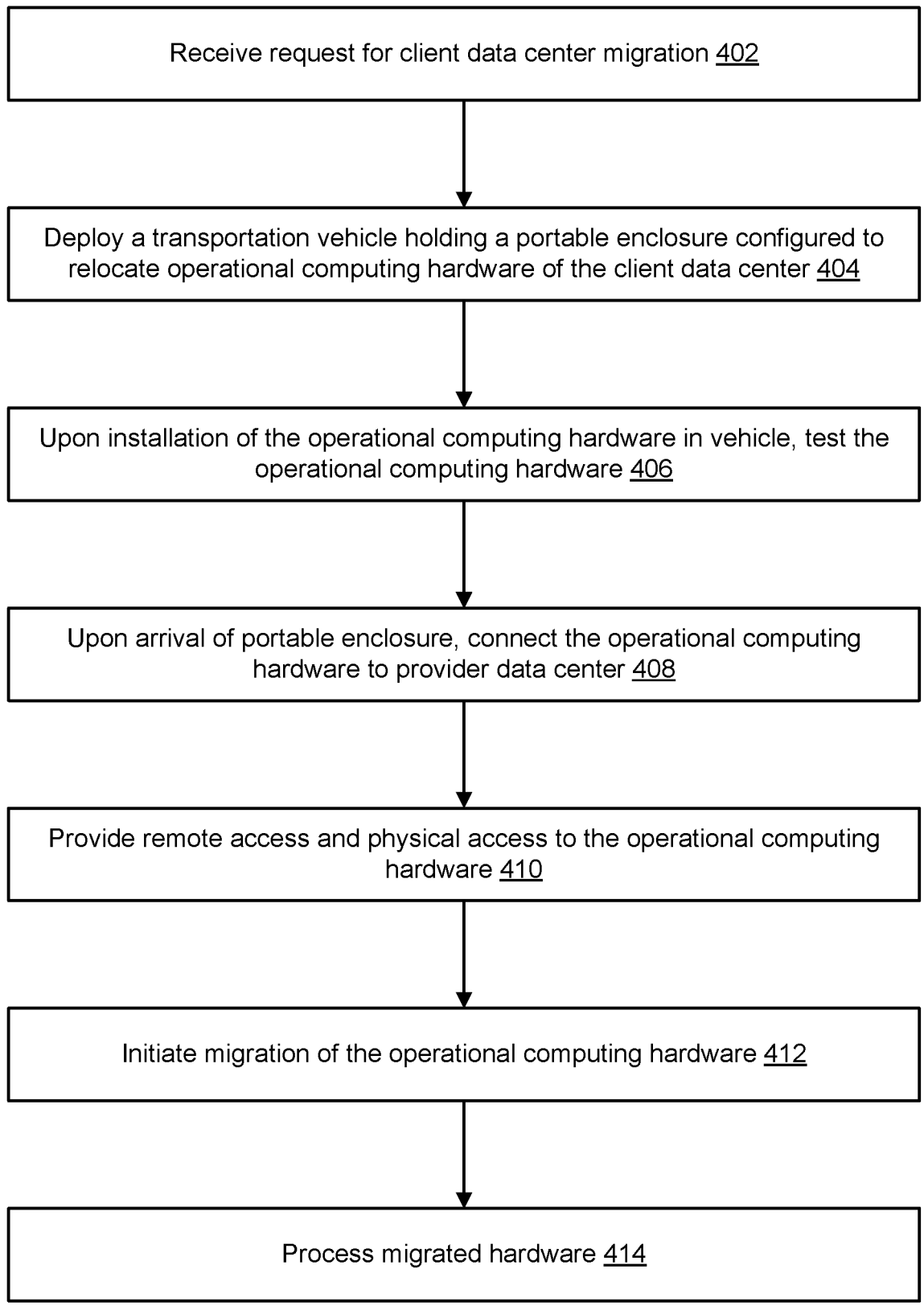
FIG. 4 illustrates an example flow associated with migration of a client data center to a provider data center, according to embodiments of the present disclosure.

FIG. 4 illustrates an example flow associated with migration of a client data center to a provider data center. The flow may be available to a provider that manages the provider data center. The provider may offer the migration as a service to a client that manages the client data center.

The example flow may start at operation 402, were the provider may receive a request for the migration. In an example, the provider may operate a computing system configured to provider an interface, such as a web interface or an API, to a client device. The client may operate the client device to submit a migration request at the interface.

At operation 404, the provider may deploy a transportation vehicle that holds a portable enclosure configured to relocate the client data center. In an example, the portable enclosure and/or the transportation vehicle may be available from a fleet of portable enclosures and transportation vehicles. A portion or all of the fleet may, but need not, be operated by the provider. The portable enclosure may be selected from the fleet based on the size and configuration of the client data center (or, the operational computing hardware subject to migration from the client data center). The transportation vehicle may be selected based on the size of the portable enclosure. The transportation vehicle may be deployed to a location of the client data center.

At operation 406, installation of operational computing hardware from the client data center in the portable enclosure, the provider may test this hardware. In an example, upon arrival to the client location, the transportation vehicle may be parked or the portable enclosure may be left at the client location. In both cases, the operational computing hardware of the client, such as servers, storage devices, networking equipment, and other devices that form the operational computing hardware of the client data center may be uninstalled from the client data center and relocated to racks inside the portable enclosure. The relocated hardware components may be reconnected in the configuration of the client data center. Power and data connectivity may be provided to this hardware. The provider and/or the client (e.g., trained operators thereof) may test the client hardware as installed in the portable enclosure to ensure that the installation is operational and properly replicates the configuration of the client data center. Once the testing is complete and any needed adjustments are made, the portable enclosure with the installed client hardware may be transported to a location associated with the provider data center by using the same or a different transportation vehicle. Similar testing may be performed once the portable enclosure is moved to the provider location.

At operation 408, the provider may connect operational computing hardware to the provider data center upon arrival of the portable enclosure to the provider location. In an example, the transportation vehicle may be parked or the portable enclosure may be moved to a secure area that is geographically close to the provider data center. Power and networking cables may be connected to a power and data interface of the portable enclosure, thereby providing power and data connectivity to the client hardware installed in the portable enclosure. Power may be provided from an external power source. The data network connection may be over a direct high-speed link to a backbone of the provider data center or may include, in part, a public network. The provider may also set-up a VPC within the provider data center for the client. The client hardware may be communicatively coupled to the VPC based on the data network connection.

At operation 410, the provider may provide remote access and physical access to the operational computing hardware. In an example, the remote access may include access of a client device to the VPC and to the connected client hardware inside the portable enclosure. The remote access to this hardware may be provided through the VPC. The physical access may include access by trained operators of the provider and/or the client to the secure area. This access may controlled by using security credentials and access controls.

At operation 412, the migration of the operational computing hardware may be initiated. The migration may include any or a combination of data migration and compute migration from the connected client hardware to the VPC. In an example, the provider and/or the client may initiate the migration via the interface of the computing system. The computing system may be configured to provision storage volume, launch compute instances, and provide other migration-related operations in association with the VPC.

At operation 414, the provider may process the migrated hardware. In an example, the processing may be subject to instructions of the client. The processing may include decommissioning, recycling, returning to the client, or repurposing the migrated client hardware for general use in the provider data center. The processing may be component-based or client data center-based. In the former case, as soon as a computing component is migrated to the VPC (e.g., data transferred from a storage device, or a compute instance launched to replace a compute device), that component may be removed from the portable enclosure and processed. In the latter case, once the migration of all the client hardware in the portable enclosure is complete, the various computing components may be removed from the portable enclosure and processed.

Figure 5:
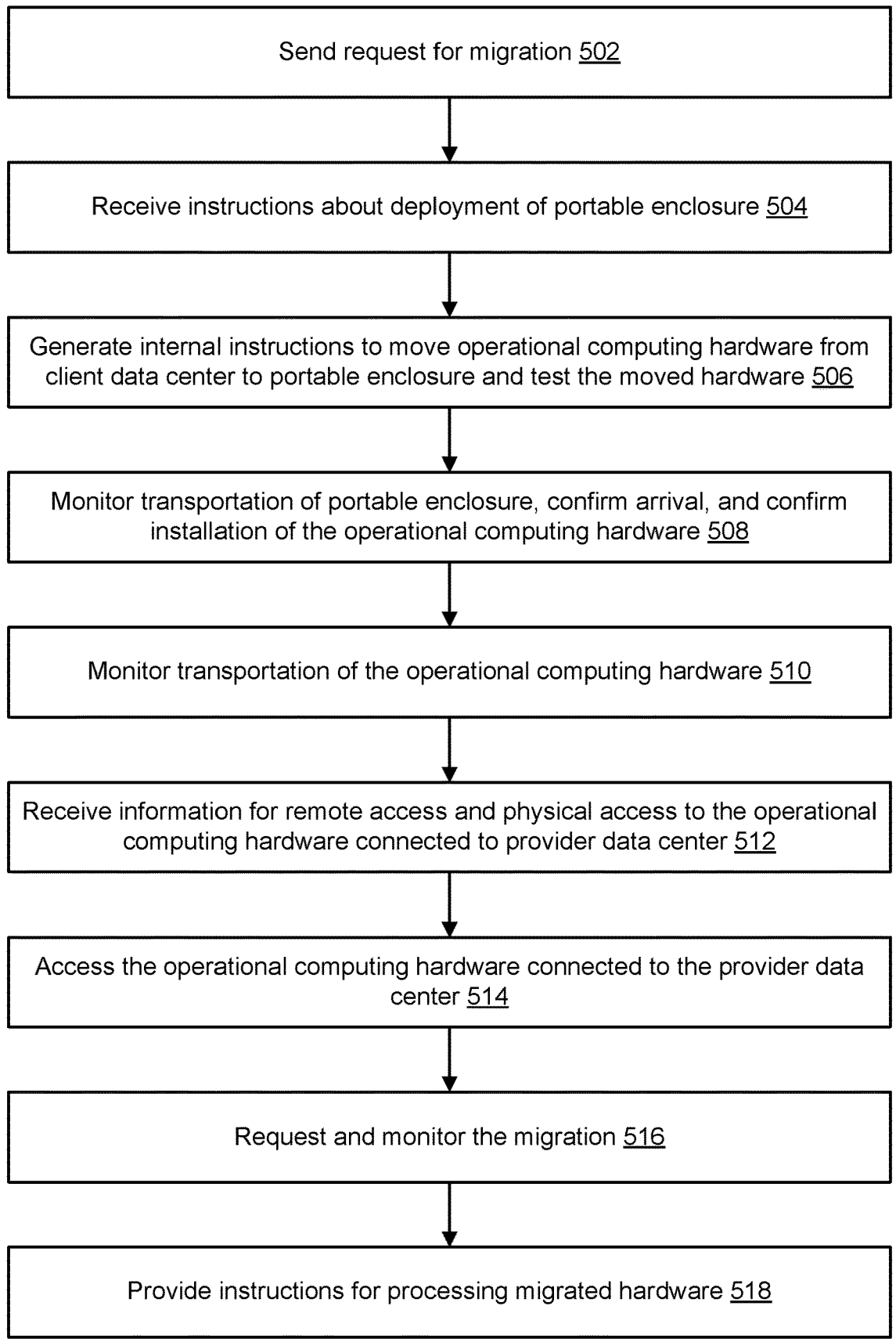
FIG. 5 illustrates an example flow associated with a client device requesting and monitoring the migration of a client data center to a provider data center, according to embodiments of the present disclosure.

FIG. 5 illustrates an example flow associated with a client device requesting and monitoring the migration of a client data center to a provider data center. The example flow may start at operation 502, were the client device may send a request for the migration to a computing system associate with the provider data center. The request may be sent over a public network based on an interface provided by the computing system.

At operation 504, the client device may receive instructions about deployment of a portable enclosure to a location associated with the client data center. In an example, the instructions may identify the portable enclosure and/or a transportation vehicle. The instructions may also include security credentials for accessing the portable enclosure and a test plan for testing the client data center once relocated to the portable enclosure.

At operation 506, the client device may generate internal instructions to move operational computing hardware from the client data center to the portable enclosure and to test the moved hardware. In an example, the internal instructions may document the workflow for the relocation and the testing based on the received instructions and on the configuration of the client data center. The internal instructions may be published to end user devices of trained operators that are tasked with performing the move and testing.

At operation 508, the client device may monitor the transportation of the portable enclosure, confirm arrival, and confirm the installation of the client data center in the portable enclosure. In an example, the client device may receive, from the computing system, data about the geolocation of the transportation vehicle and may display this data on a map. The client device may also send to the computing system a confirmation that the transportation vehicle and the portable enclosure arrived to the client location. Further, the client device may receive status updates from the end user devices about the installation of the client hardware in the portable enclosure, the testing, and any needed troubleshooting. Once these activities are complete, the client device may send, to the computing system, a confirmation that the operational computing hardware was properly moved to the portable enclosure.

At operation 510, the client device may monitor transportation of the operational computing hardware in the portable enclosure to a location associated with the provider data center. In an example, the client device may receive, from the computing system, data about the geolocation of the transportation vehicle as it travels to the provider location. The client device may display this data on a map.

At operation 512, the client device may receive information for remote access and physical access to the operational computing hardware of the client connected to the provider data center. In an example, the portable enclosure may be moved to a secure area associated with the provider data center. Power and data connectivity may be provided to the client hardware installed in the portable enclosure. A VPC may be provisioned within the provider data center for the client. A private network connection may exist between the VPC and the client hardware. The client device may receive the information from the computing system. The information may include configuration parameters and credentials to access the VPC from the client device over a public data network. The information may also include security credentials for physical access of trained operators to the secure area and to the portable enclosure.

At operation 514, the client device may access the operational computing hardware connected to the provider data center. In an example, the client device may have remote access to the client hardware in the portable enclosure via the VPC and the private network connection between the VPC and the client hardware.

At operation 516, the client device may request and monitor the migration of the operational computing hardware. In an example, the client device may send instructions to the computing system to transfer some or all of the client data from client storage device in the portable enclosure to storage volumes in the VPC. Additionally or alternatively, the client device may send instructions to the computing system to launch a number of compute instances in the VPC, where these compute instances may have configurations that correspond to client compute devices in the portable enclosure. The computer system may send to the client device status updates about the progress of the data and/or compute migrations.

At operation 518, the client device may provide instructions for processing client hardware. In an example, the client device may send the instructions to the computer system. The instructions may specify whether particular or all components of the client hardware in the portable enclosure should be decommissioned, recycled, returned, or repurposed.

Figure 6:
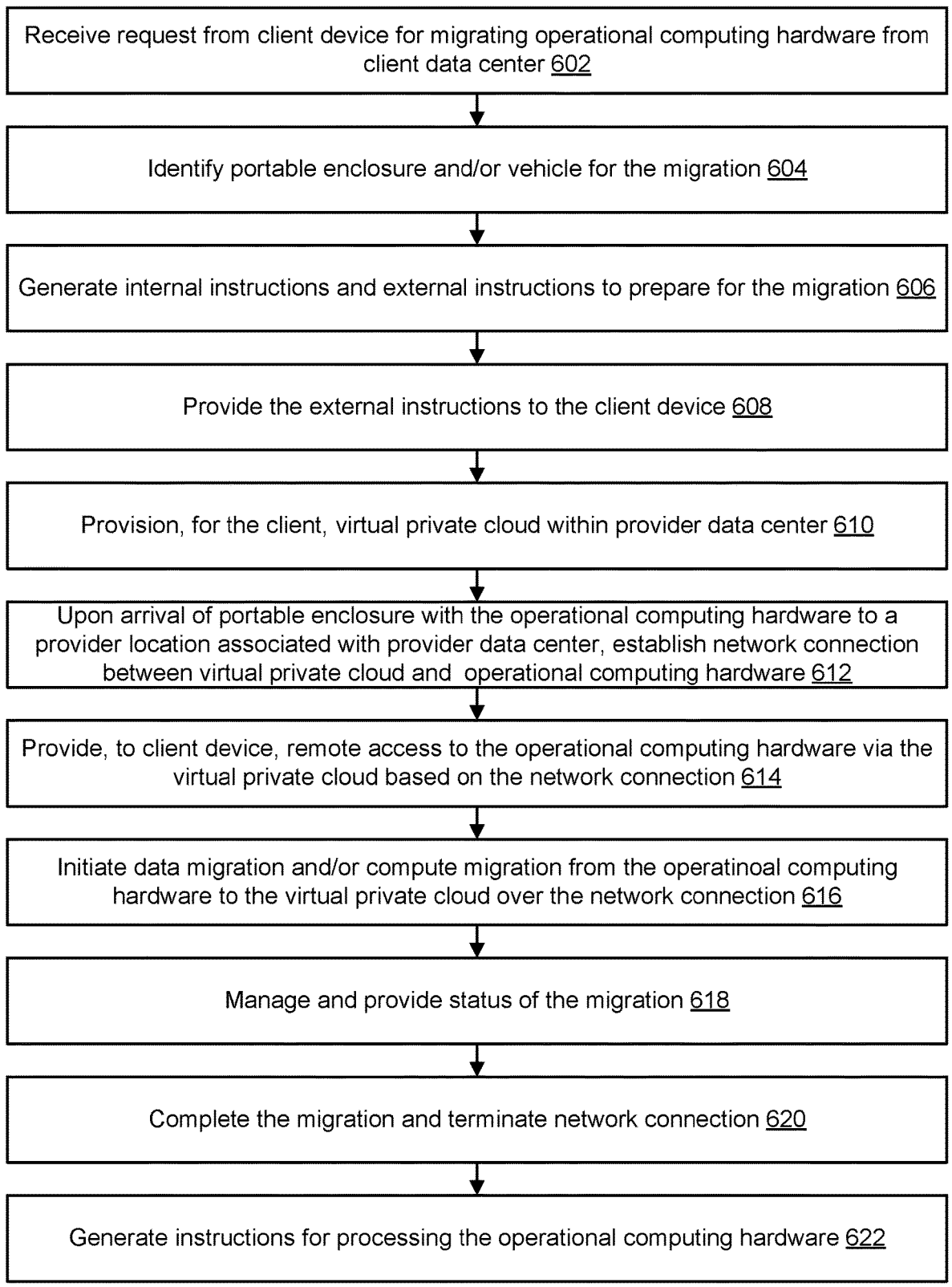
FIG. 6 illustrates an example flow associated with a computing system of a provider facilitating the migration of a client data center to a provider data center, according to embodiments of the present disclosure.

FIG. 6 illustrates an example flow associated with a computing system of a provider facilitating the migration of a client data center to a provider data center. The computing system may host functionalities of a control plane that manage computing services in the provider data center.

The example flow may start at operation 602, were the computing system may receive a request from a client device for migrating operational computing hardware from the client data center. In an example, the request may be a migration request that identifies the client, the client data center, a physical size of the operational computing hardware, and/or a configuration of the operational computing hardware. The request may also specify parameters around the migration, such as its type (e.g., data and/or compute migrations), timing, service level, redundancy of the migration, and/or other migration-related parameters. Further, the request may provide instructions for processing the migrated client hardware (e.g., the storage devices, compute devices, networking equipment, and/or other client computing devices that belong to the client data center). The request may be received at an interface provided by the computing system to the client device over a public network.

At operation 604, the computing system may identify a portable enclosure and/or a transportation vehicle for the migration. In an example, multiple portable enclosures and transportation vehicles may be available from a fleet. The system may match the size and/or configuration to attributes of the portable enclosure. For instance, the portable enclosure is selected if it is large enough and has enough equipment racks, power interfaces, data interfaces, and cooling to accommodate the operational computing hardware. The system may also select the transportation vehicle based on a determination that the transportation vehicle can accommodate the portable enclosure and travel to and from the client location.

At operation 606, the computing system may generate internal instructions and external instructions to prepare for the migration. In an example, these instructions may be based on the request received from the client and may be associated with the operational computing hardware that should be migrated. The internal instructions may specify various new or updates, if needed, to configuration parameters of a VPC associated with the client based on the configuration of the client data center (or, more specifically, the operational computing hardware). The external instructions may provide information about the migration to the client device. For instance, the external instructions may identify the portable enclosure and/or transportation vehicle and may include credentials. The external instructions may also provide workflow for installing the operational computing hardware in the portable enclosure and a test plan for testing the installed client hardware to ensure proper replication of the client data center. This testing may occur at any or both of the client location and provider location.

At operation 608, the computing system may provide the external instructions to the client device. In an example, the external instructions are sent over the public network to the client device.

At operation 610, the computing system may provision the VPC within the provider data center for the client based on the internal instructions. Various types of provisioning may be possible. In an example, the VPC may be provisioned anew for the client in response to the migration request. For instance, the computing system may set-up various computing resources of the provider data center to host the VPC. Virtual network interconnections, firewalls, gateways, and NAT services may be set-up. Storage volumes may be allocated. Compute instances may be launched or configuration for the compute instances may be prepared such that the compute instances may be provisioned for launching. In another example, the VPC may already have been provisioned within the provider data center and available to the client prior to the migration request. In this example, the VPC may be updated as needed to connect to any previously unconnected client hardware. In a further example, prior to the migration request, the client data center may host a VPC. For instance, the operational computing hardware may provide the underlying computing resources for the hosting. In this example, provisioning the VPC within the provider data center may include setting-up or updating the network parameters of this VPC for peering with the other VPC (once this other VPC is relocated with the operational computing hardware).

At operation 612, the computing system may establish a network connection between the VPC and the operational computing hardware upon an arrival of the portable enclosure to a location associated with the provider data center. In an example, the portable enclosure may be moved to a secure area in geographic proximity to the provider data center. Power may be provided to the client hardware installed in the portable enclosure via a power interface of the portable enclosure. Through a data interface of the portable enclosure, data connectivity may be available between the client hardware and a backbone of the provider data network over a direct high-speed link or a public network. The computing system may establish a private network connection that uses VPN and/or other associated secure communication over the direct high-speed link or the public network. For instance, the computing system may act as an intermediary that passes IP addresses and security parameters between gateways of the VPC and the client hardware installed in the portable enclosure. Further, if the operational computing hardware of the client hosts its own VPC, establishing the network connection may include peering the two VPCs.

At operation 614, the computing system may provide, to the client device, remote access to the operational computing hardware via the VPC based on the network connection. In an example, the computing system may update access policies of the VPC to authorize and authenticate the remote access of the client device and update NAT services to route traffic to and from the client device.

At operation 616, the computing system may initiate data migration and/or compute migration from the operational computing hardware to the VPC over the network connection. In an example, the data and/or compute migrations may be based on the received request for the migration and/or on a preference of the client for performing the migration. The data migration may include transferring client data from client storage devices installed in the portable enclosure. The compute migration may include migration of compute operations from client compute devices installed in the portable enclosure to compute instances of the VPC.

The two types of migration may be performed in a sequential manner, parallel manner, or independently of each other. For instance, the data migration may be initiated first and the compute migration may be delayed. The compute migration may be initiated near their end of life. In the time period between the completion of the data migration and the initiation of the compute migration, the client compute devices may remain remotely accessible and usable to the client device. In this way, the use of the client compute devices may be extended as much as possible. Further, operations under each type of migration may be performed in a sequential manner, parallel manner, or independently of each other. For instance, if a first compute device has a shorter end of life relative to a second compute device, the compute migration of the first compute device may be performed first. During the compute migration of the first compute device, the second compute device may still be remotely accessible and usable to the client device.

At operation 618, the computing system may manage and provide status of the migration. In an example, the computing system may monitor the progress of the migration and may send status updates to the client device. At any time during the migration, the computing system may receive additional instructions from the client device to change certain aspects of the migration (e.g., to stop the data migration or to migrate a particular client computing device). The computing system may also receive a request that may change a configuration of the VPC (e.g., a request for additional storage volumes or compute instances in the VPC). Accordingly, the computing system may update the migration and configuration of the VPC.

At operation 620, the computing system may complete the migration and terminate the network connection. In an example, the termination of the network connection may be migration-based or may be device based. In the former case, once the entire data and compute migrations are complete, the computing system may terminate the network connection. In the latter case, as soon as migration from one particular client storage device or client compute device is complete, the network connection may be terminated for that particular device.

At operation 622, the computing system may generate instructions for processing the operational computing hardware. In an example, the instructions may depend on the migration request or the profile of the client. The instructions may also be specific to a device level or may be generic to the entire network of the operational computing hardware.

Various types of processing may be available, including decommissioning, recycling, returning to a client location, and/or repurposing the client hardware installed in the portable enclosure. For instance, upon completion of a compute migration of a client compute device, that device may be removed from the portable enclosure and recycled independently of whether other migration is ongoing. Accordingly, the generated instructions may specify the removal and recycling of the particular compute devices while other data and compute migrations may be ongoing. In another illustration, once the data and compute migrations are entirely complete, the client storage devices and client compute devices may be repurposed such that they become parts of the provider data center and may be used to host computing services for clients.

While the operations of the example flows of FIGS. 4-6 are illustrated in a particular order, it should be understood that no particular order is necessary and that one or more operations may be omitted, skipped, and/or reordered. In addition, although the operations are illustrated in connection with the migration of a single client data center to a single provider data center, the operations may similarly apply to one-to-many, many-to-one, and many-to-many migrations. For instance, a single client data center may be migrated to multiple provider data centers for redundancy. Multiple client data centers may be migrated to a single provider data center for consolidation and potential speed of light issues. Furthermore, although the operations are illustrated in connection with a single client and single provider, the operations may similarly apply to migration of client data centers of multiple clients and to migration to provider data center of multiple providers.

Figure 7:
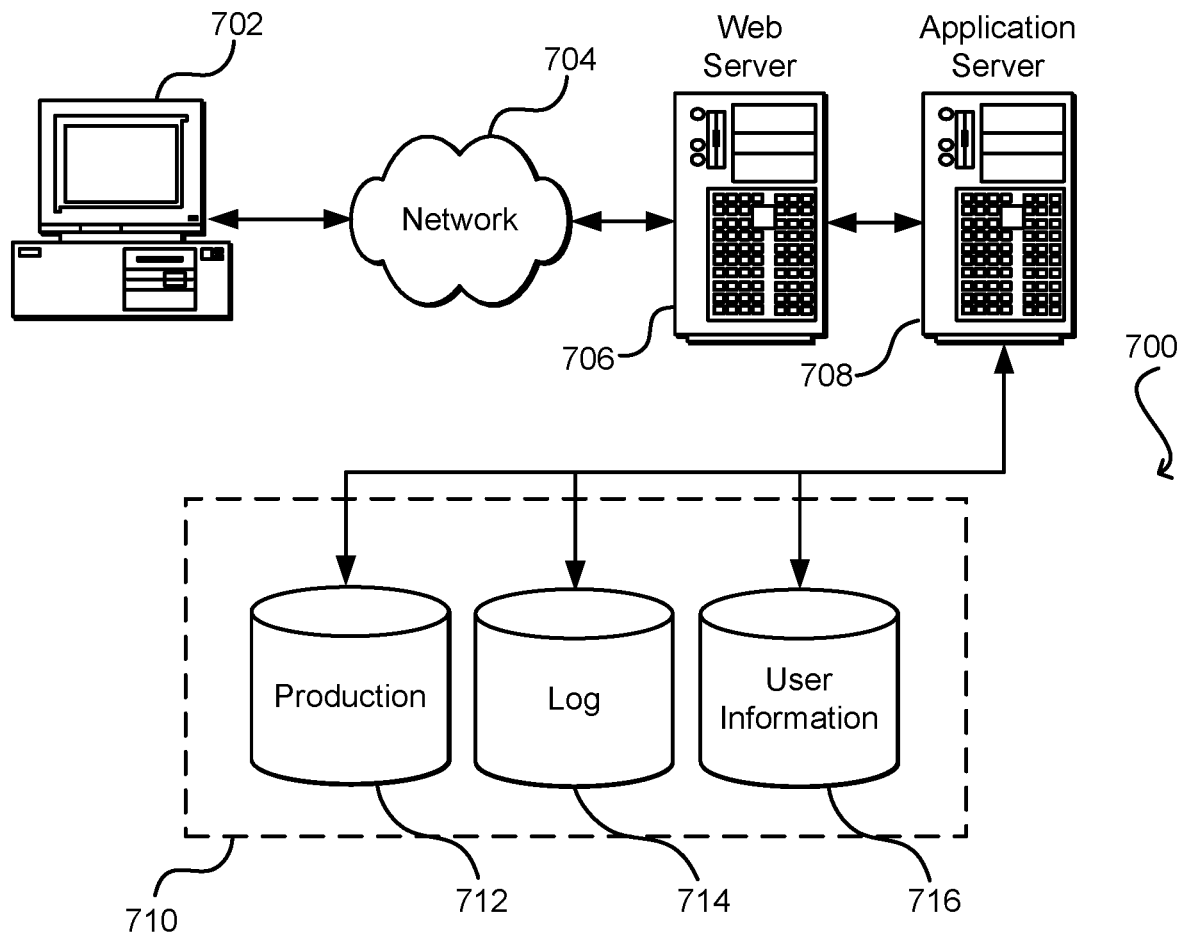
FIG. 7 illustrates aspects of an example environment for implementing aspects of a the present disclosure.

FIG. 7 illustrates aspects of an example environment 700 for implementing aspects of a the present disclosure. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases, or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the embodiments to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
a provider data center;
a portable enclosure; and
a computing system that comprises one or more processors and one or more computer-readable storage media storing executable instructions that, upon execution by the one or more processors, configure the system to:
   receive, from a client device, a request for migrating a client data center to the provider data center, the client data center comprising operational computing hardware;
   identify the portable enclosure based at least in part on a configuration of the operational computing hardware from the client data center, the portable enclosure being configured to store the operational computing hardware;
   deploy a vehicle to the client data center, the vehicle being configured to transport the portable enclosure storing the operational computing hardware from the client data center, the operational computing hardware from the client data center performing operations while being transported in the portable enclosure;
   provision a virtual private cloud within the provider data center; and
   based at least in part on determining that the operational computing hardware operating within the portable enclosure has arrived at the provider data center:
      establish a network connection between the virtual private cloud and the operational computing hardware from the client data center operating within the portable enclosure;
      provide, to the client device, remote access to the operational computing hardware from the client data center via the virtual private cloud based at least in part on the network connection, initiate data migration from the operational computing hardware from the client data center to the virtual private cloud over the network connection, and initiate migration of compute operations from the operational computing hardware from the client data center to compute instances of the virtual private cloud over the network connection.

2. The system of claim 1, wherein provisioning the virtual private cloud comprises setting up the virtual private cloud based at least in part on the request for the migrating.

3. The system of claim 1, wherein provisioning the virtual private cloud comprises setting up the virtual private cloud prior to receiving the request for the migrating and updating network parameters of the virtual private cloud based at least in part on the request for the migrating.

4. The system of claim 1, wherein establishing the network connection between the virtual private cloud and the operational computing hardware from the client data center comprises peering the virtual private cloud and another virtual private cloud hosted on the operational computing hardware from the client data center.

5. A computer-implemented method comprising:

sending, by a computing system of a provider to a client device, instructions that are associated with operational computing hardware, the instructions sent based at least in part on a client request for relocating the operational computing hardware from a client location, the operational computing hardware from the client location being transportable in a portable enclosure, the operational computing hardware performing client compute operations and storing client data while being transported in the portable enclosure;

provisioning, by the computing system, a private network within a data center of the provider; and based at least in part on an arrival of the portable enclosure with the operational computing hardware from the client location to a provider location associated with the data center:

establishing, by the computing system, a network connection between the private network and the operational computing hardware operating in the portable enclosure, and providing, by the computing system to the client device, remote access to the operational computing hardware via the private network based at least in part on the network connection.

6. The computer-implemented method of claim 5, wherein the operational computing hardware comprises a storage device that stores the client data, and further comprising:

migrating, by the computing system, the client data from the storage device to a data storage in the private network, wherein the client data is migrated over the network connection.

7. The computer-implemented method of claim 5, wherein the operational computing hardware comprises a compute device configured to provide a set of the client compute operations, and further comprising:

launching, by the computing system, a compute instance in the private network, wherein the compute instance is configured to provide the set of the client compute operations.

8. The computer-implemented method of claim 5, wherein the operational computing hardware comprise a compute device and a storage device, and further comprising:

initiating, by the computing system, data migration from the storage device to the private network over the network connection; and providing, by the computing system to the client device over the network connection, access to the compute device via the private network while the data migration is ongoing.

9. The computer-implemented method of claim 8, further comprising:

terminating, by the computing system and based at least in part on completion of the data migration, the network connection; and generating, by the computing system and based at least in part on the completion of the data migration, additional instructions to send the storage device and the compute device to the client location.

10. The computer-implemented method of claim 5, wherein the operational computing hardware comprises a first compute device and a second compute device, and further comprising:

initiating, by the computing system over the network connection, first migration of first client compute operations from the first compute device and second migration of second client compute operations from the second compute device to the private network; and generating, by the computing system, additional instructions for removing the first compute device from the portable enclosure based at least in part on a completion of the first migration and while the second migration is still ongoing.

11. The computer-implemented method of claim 5, wherein the client request identifies that the operational computing hardware has a particular end of life, wherein the client request further identifies second operational computing hardware that has a different end of life, and wherein the instructions identify at least a second portable enclosure for relocating the second operational computing hardware based at least in part on the different end of life.

12. The computer-implemented method of claim 5, wherein the client request comprises a selection of the data center from a plurality of data centers of the provider, and wherein the instructions comprise a plan for testing the operational computing hardware in the portable enclosure.

13. One or more non-transitory computer-readable storage media storing executable instructions that, upon execution by one or more processors of a system, configure the system to perform operations comprising:

sending, to a client device, instructions associated with a relocation of operational computing hardware from a client location utilizing a portable enclosure, the instructions sent based at least in part on a client request for the relocation, the operational computing hardware performing client compute operations and storing client data while being relocated in the portable enclosure;

provisioning a private network within a data center of a provider; and based at least in part on an arrival of the operational computing hardware operating in the portable enclosure at a provider location associated with the data center:

establishing a network connection between the private network and the operational computing hardware operating in the portable enclosure, providing, to the client device, remote access to the operational computing hardware via the private network based at least in part on the network connection, and initiating migration of the client data from the operational computing hardware to the private network over the network connection.

14. The one or more non-transitory computer-readable storage media of claim 13, wherein the operations further comprise:

sending, to the client device, second instructions about relocating second operational computing hardware from a second client location to a second data center of the provider, the second instructions at least identifying a second portable enclosure;

provisioning a second private network within the second data center; and establishing a private network connection between the private network and the second private network.

15. The one or more non-transitory computer-readable storage media of claim 13, wherein the operations further comprise:

sending, to the client device, second instructions about relocating second operational computing hardware from a second client location to the data center, the second instructions at least identifying a second portable enclosure; and based at least in part on an arrival of the second portable enclosure with the second operational computing hardware operating in the second portable enclosure to the provider location associated with the data center, establishing a second network connection between the private network and the second operational computing hardware operating in the second portable enclosure.

16. The one or more non-transitory computer-readable storage media of claim 13, wherein the network connection is established based at least in part on power being available to the portable enclosure, wherein the power is available based at least in part on utilizing a power interface of the portable enclosure with at least one of: a power source at the provider location or a backup power source at the provider location, wherein the power source is dedicated to the operational computing hardware.

17. The one or more non-transitory computer-readable storage media of claim 13, wherein the portable enclosure is stored in a secure area at the provider location, wherein the secure area is separate from a second secure area at the provider location and storing a second portable enclosure.

18. The one or more non-transitory computer-readable storage media of claim 13, wherein the instructions further identify a service level from a plurality of selectable service levels, wherein the service level comprises at least one of: redundant power, redundant data connectivity, or secure area access.

19. The one or more non-transitory computer-readable storage media of claim 13, wherein the client request identifies a physical size and a configuration of the operational computing hardware, and wherein the operations further comprise identifying the portable enclosure from different sized portable enclosures based at least in part on the physical size and the configuration.

20. The one or more non-transitory computer-readable storage media of claim 13, wherein the portable enclosure comprises a data connectivity interface and a power component that are utilized by the operational computing hardware to perform the client compute operations while being transported within the portable enclosure from the client location to the provider location.

* * * * *